United States Patent [19]
Okada

[11] Patent Number: 6,101,548
[45] Date of Patent: Aug. 8, 2000

[54] COMMUNICATIONS TERMINAL DEVICE WITH ELECTRONIC MAIL FUNCTION

[75] Inventor: Kazuhiro Okada, Moriyama, Japan

[73] Assignee: Murata Kikai Kabushiki Kaishi, Kyoto, Japan

[21] Appl. No.: 09/078,345

[22] Filed: May 13, 1998

[30] Foreign Application Priority Data

May 20, 1997 [JP] Japan ..................................... 9-130170

[51] Int. Cl.$^7$ .................................................. G06F 15/16
[52] U.S. Cl. .......................... 709/236; 709/232; 709/200; 709/219; 709/224
[58] Field of Search ................................... 709/200, 219, 709/224, 232, 236; 380/9

[56] References Cited

U.S. PATENT DOCUMENTS

| | | | |
|---|---|---|---|
| 5,166,932 | 11/1992 | Hoff et al. | 370/349 |
| 5,452,356 | 9/1995 | Albert | 380/9 |
| 5,566,000 | 10/1996 | Propach et al. | 358/412 |
| 5,896,502 | 4/1999 | Shieh et al. | 709/224 |
| 5,933,600 | 8/1999 | Shieh et al. | 709/219 |

FOREIGN PATENT DOCUMENTS

| | | |
|---|---|---|
| 7-297972 | 10/1995 | Japan . |
| 97-10668 | 3/1997 | WIPO . |

OTHER PUBLICATIONS

Freed & Borenstein Nov. 1996, Multipurpose Internet Mail Extensions (MINE) Part Two: Media Types.
GreaterNET Technical Support Free Agent Help Guide [Jul. 07, 1995].

*Primary Examiner*—Viet D. Vu
*Assistant Examiner*—Chuong Ho
*Attorney, Agent, or Firm*—Hogan & Hartson LLP

[57] ABSTRACT

A communications terminal device such as a facsimile device with a function of transmitting original document image data to a destination by electronic mail. Before image data transmission to a destination by electronic mail, a main controller of the facsimile device converts the image data on one page of original document to electronic mail data and determines how much volume the image data has. The image data on one page of original document is transmitted to a destination by a single electronic mail when the calculation result does not exceed a prescribed volume. On the other hand, the original image on one page of original document is divided up into smaller pieces of data and transmitted to a destination by a plurality of electronic mails respectively when the calculation result exceeds a prescribed volume.

4 Claims, 3 Drawing Sheets

FIG. 2

To:AAAAAAA@aaaaaa.or.jp

From:BBBBBB@bbbbbb.or.jp

Subject:ABC123456;J001;P001/002;B01/01
        (Field1)  (Field2) (Field3)  (Field4)

COMMUNICATIONS TERMINAL DEVICE WITH ELECTRONIC MAIL FUNCTION

BACKGROUND OF THE INVENTION

1. Technical Field

The present invention relates to a communications terminal device provided with a function for transmitting original document image data by electronic mail (e-mail).

2. Background Art

Recent years have seen the spread of computer communications networks, which deliver electronic mail by the Internet, or the like, wherein local computer communications nets are connected via communications lines and then developed further into networks. Computer communications networks provide excellent error-correction functions, and by simply paying a communications charge to the end-provider (company connecting to the computer communications network), it is possible to communicate with computers not only domestically, but also overseas.

Since the communications procedures and communications systems in conventional G3 facsimile devices differ from those in computer communications networks, the G3 facsimile devices cannot be connected directly to these networks. However, even if the image data is in the form of an original document for transmission, or the like, it is possible to transmit the image data to a desired destination through a computer communications network by converting the image data to an electronic mail format.

Incidentally, as a method of accessing the Internet, besides taking a contract with a provider, it is also possible to use a connection service provided by a commercial BBS for PC communications. Of these commercial BBS, some impose restrictions on the amount of data, number of lines, etc. of text data which can be handled by a single mailing. This is in order to avoid the occurrence of problems, such as communication line congestion, caused by transferring a large volume of data to the Internet in one operation.

In the case of transmission of facsimile image data which generally involves a large data volume, the data volume on a single page of original document may exceed the limit for one mailing. Since mail containing a data volume exceeding the limit will be refused for transmission by a commercial BBS, it is often impossible to send facsimile image data by electronic mail.

Japanese Patent Application, Laid-Open Publication No. 8-314821 discloses a high speed data transmission method which divides a single file into a plurality of segments before transmission, sends these segments to a destination through a plurality of communications lines, and combines the segments to a single file on the receiving side. However, this method requires a plurality of communications lines extending between the data sending machine and the data receiving machine.

SUMMARY OF THE INVENTION

The present invention was devised in order to overcome the above described problems.

An object of the present invention is to provide a communications terminal device with electronic mail function which makes it possible to transmit image data by electronic mail using a single communications line even when the data volume to be transmitted in the form of electronic mail is large (e.g., even if the data volume on one page of original document is larger than a predetermined amount for one electronic mail determined by an intermediate communications service company).

Another object of the present invention is to provide a communications terminal device with electronic mail function which facilitates handling or managing of a plurality of image data received in the form of a plurality of electronic mails. A single page of original document is divided into a plurality of smaller pieces of image data on the sending side before transmission and are transmitted in the form of a plurality of electronic mails to the receiving side if the data volume on a single page of original document is large. In such a case, the electronic mails received should be combined to a single image to reproduce the original image on a single sheet of recording paper. However, if the data volume on a single page of original document is small and does not exceed the one-mail limitation and a plurality of such electronic mails are received, these electronic mails should be printed on a plurality sheets of recording paper respectively.

According to the first aspect of the present invention, there is provided a communications terminal device with a function of transmitting original document image data by electronic mail, comprising: means for calculating the data volume when the image data on one page of original document to be transmitted is converted to electronic mail data, means for dividing up the image data on one page of original document into smaller pieces of image data and transmitting them to a destination by a plurality of electronic mails respectively when the calculation result exceeds a prescribed volume, and means for transmitting the image data by a single electronic mail without dividing when the calculation result does not exceed the prescribed volume.

Before image data transmission to a destination by electronic mail, the communications terminal device of the present invention converts the image data on one page of original document to electronic mail format and determines (calculates) how much data volume this electronic mail has. If the calculation result does not exceed a prescribed volume, for example the volume for one mailing, it transmits the data in a single mail. If the calculation result exceeds the prescribed volume, it divides up the image data for one page to smaller pieces of data and transmits them by a plurality of mails. Therefore, it is possible to send image data by electronic mail even when the data volume is large.

The communications terminal device of the present invention may further include means for providing each of a plurality of electronic mails with first mail management information when the plurality of electronic mails correspond to a plurality of pages of original documents respectively (i.e., when the original image on one page of original document is not divided into smaller data pieces before transmission). The mail management information includes data identifying the original document or/and data indicating which electronic mail corresponds to which page of original document.

When transmitting a plurality of pages of original documents by means of a plurality of electronic mails respectively, the communications terminal device appends the mail management or control information to each of the electronic mails. By referring to this management information, the receiving machine is possible to know which electronic mail represents which page of original document. Thereby, handling of a plurality of electronic mails which correspond to a plurality of original documents is facilitated on the receiving side, and regeneration of the original images on the receiving side is also facilitated.

The communications terminal device of the present invention may further include means for attaching each of a plurality of electronic mails with second mail management information when the plurality of electronic mails in combination correspond to a single page of original document (i.e., when the original image on one page of original document is divided into smaller pieces of data before transmission). The second mail management information includes data indicating which electronic mail corresponds to which piece of the single original image. Thereby, handling of the plurality of electronic mails is facilitated. Specifically, although a plurality of image segments are carried by the plurality of electronic mails, a communications device on the receiving side can synthesize these image segments to a single image to reproduce an original image appropriately.

The first and second mail management information may be appended to each of the electronic mails in the form of mail header information.

BRIEF DESCRIPTION OF THE ACCOMPANYING DRAWINGS

FIG. 2 is a diagram showing one example of the contents of header information and the format thereof.

DETAILED DESCRIPTION OF THE PREFERRED EMBODIMENTS

The present invention will now be described using a facsimile device as an example of a communications terminal device. In this particular embodiment, the Internet is used as a computer communications network.

Figure 1:
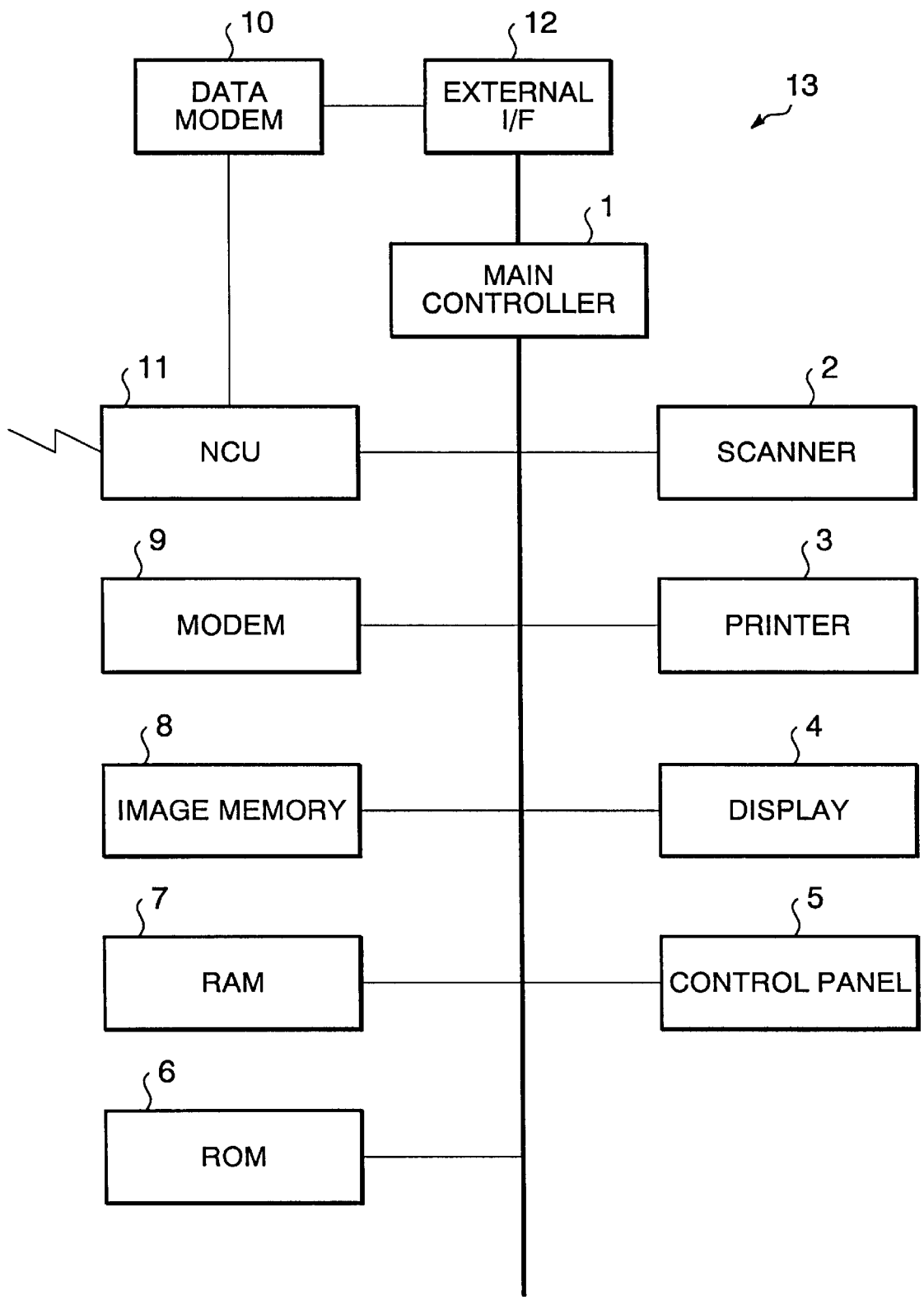
FIG. 1 is a block diagram of a facsimile device with electronic mail function according to the present invention.

Referring to FIG. 1, a main control section 1 controls each hardware section of the facsimile device 13 via a bus, and it also implements software, such as communications procedures, including encryption (encoding) and decryption (decoding) of the original document image data by means of an encryption system, such as MH, MR, MMR, etc., image (TIFF) conversion, binary text conversion, mail editing, modem switching, RS232C control via AT commands, and the like, on the basis of software stored In the ROM 6.

In addition, the main control section 1 of this embodiment calculates the volume of data resulting when the image data for one page of original document is converted to electronic mail data by means of dummy encoding, which will be described later in detail, and it divides the original image data into a plurality of electronic mails when the volume of the original image data exceeds the commercial BBS volume limit.

In image conversion, when the facsimile device 13 transmits data to a remote communications device (not shown), G3 format image data is converted to TIFF (Tagged Information File Format), which is a general image format used by computers, and when receiving data from a remote communications device, the image data is converted from TIFF to G3 format. TIFF was developed by Adobe Systems, Inc. and various classes are defined for handling not only black and white binary, but also black and white multiple-value and full color. One of these classes is CLASS F for defining G3 format image data, which is original document image data encoded by an encoding system such as MH, MR or NMR. Therefore, G3 format image data can be converted to TIFF by appending TIFF header information of CLASS F to the leading segment of the G3 format image data.

In binary text conversion, when the facsimile device 13 transmits data to a remote communications device, binary data is converted to text data, and when receiving, text data is converted to binary data. The Internet includes some computers which cannot handle electronic mail in binary data form. When transmitting binary data in the form of TIFF image data or the like, the binary data is first converted to text data in order that the electronic mail reaches the intended party reliably. In RFC (Request For Comments) 822, which is a document published by the IETF (Internet Engineering Task Force), the text data handled by the Internet is designated as 7-bit code data.

The data is then converted using MIME (Multi-purpose Internet Mail Extensions) base 64, or the like. According to this, 6-bit binary data can be converted to text data by replacing it with a single one of 64 characters (upper-case and lower-case alphabets, numerals, +, /). MIME is stipulated in RFC 1521, 1341, etc.

In mail editing, when the facsimile device 13 transmits data, TIFF image data converted to text data is edited to electronic mail format by appending mail header information, and when receiving data, the mail header information is removed from the electronic mail format data, and only TIFF image data converted to text data is extracted. In Internet electronic mail, the addition of prescribed header information is designated as electronic mail control or management information, and therefore when transmitting, items such as "From:" (Internet e-mail address of user), "To:" (Internet e-mail address of recipient), "Subject:", etc. are appended.

FIG. 2 shows an example of header information and its format.

In the "Subject" field of the header information of this example, information relating to the division of a facsimile original document transmitted by electronic mail is inserted, and this field is analyzed by the receiving side.

Here, the "Subject" field has four sections or subfields, each divided by a semi-colon. The first subfield (Field 1) contains information on the sender such as its log-on ID, the second subfield (Field 2) contains the job number for identifying mail handled by a single reception file, the third subfield (Field 3) contains the page number (XXX) and total number of pages (YYY) in the format PXXX/YYY, and the fourth subfield (Field 4) contains the block or segment number of a divided image (i.e., when an original image on one page of original document is divided into smaller pieces of data for transmission) (XX) and the total number of blocks (YY) in the format BXX/YY.

When the fourth subfield is B01/01, this indicates that the image data on a single page of original document is not divided.

Referring back to FIG. 1, the reading section (or scanner) 2 reads the original document by means of a CCD, or the like, and it outputs black and white binary image data for the original document.

The recording section 3 comprises a printer, such as an electrophotographic printer or the like, and it prints an image on a recording sheet based on data received from a remote G3 facsimile device or from the Internet thereby reproducing an original image.

The display section 4 comprises a liquid crystal display device, or the like, and it displays the operational state of the facsimile device 13, and the original document image data.

The control panel 5 comprises push keys required for operating the facsimile device 13, quick-dial keys, one-touch dial keys, and various other functional keys, and the like.

The ROM 6 stores software required for the operation of the facsimile device 13.

The RAM 7 is constituted by an SRAM or flash memory, etc., and it stores temporary data generated during software execution.

The image memory 8 is constituted by a DRAM, or the like, and it stores original document image data.

The modem 9 is a modem for facsimile transmission of original document image data read in by the reading section 2, and it is not provided with a data transmission function in this particular embodiment.

The data modem 10 is a modem for data communications which transmits, for example, image data of an original document converted to electronic mail, via the Internet. It is connected to an external telephone terminal, for example, provided in a chip in an NCU 11, by means of a telephone cable, and is it also connected to an external I/F 12 serial port by RS232C for connection to personal computers, and the like.

The NCU 11 connects and disconnects the analogue circuitry.

It should be noted that it is also possible to omit the data modem 10, and to combine the functions of a data modem and a facsimile modem in the modem 9.

Figure 3:
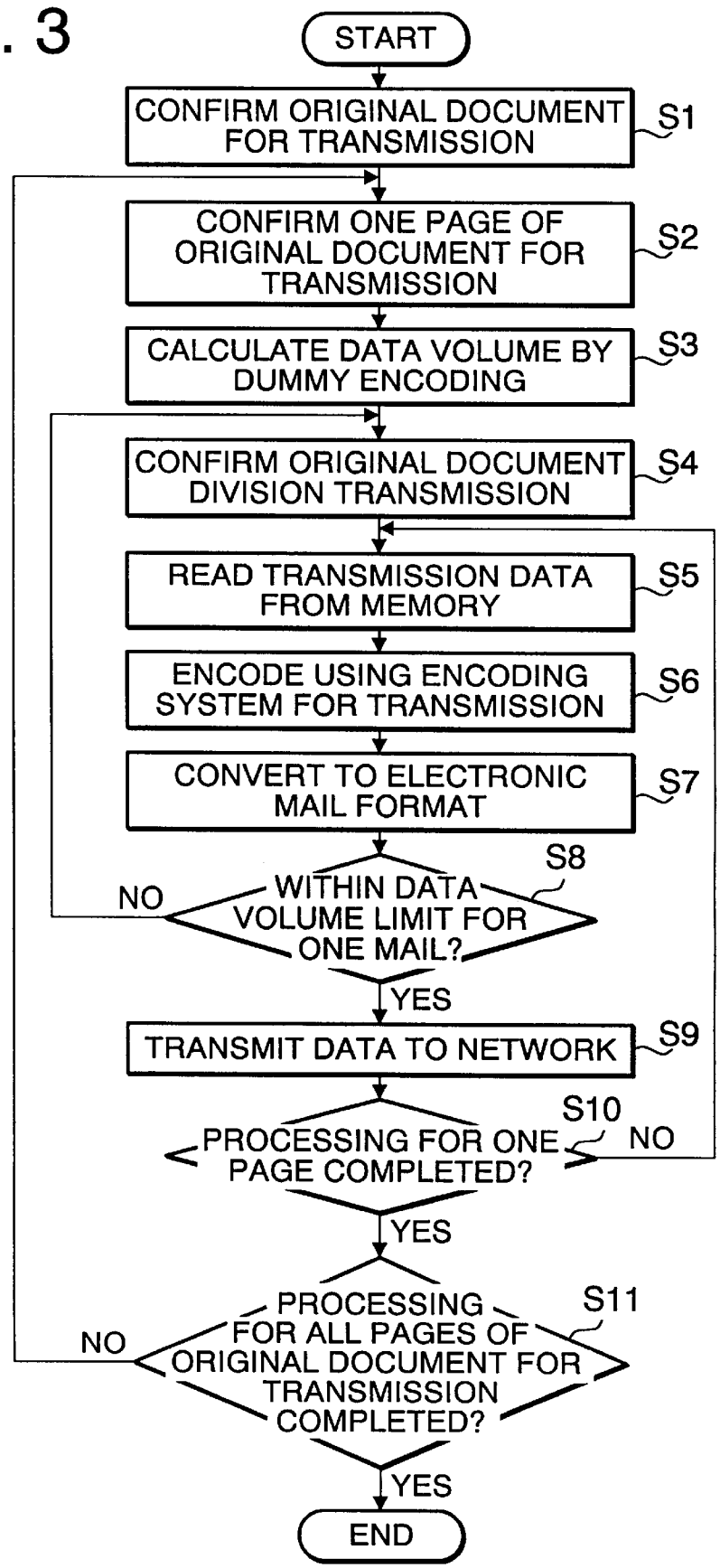
FIG. 3 is a flowchart of the operations to be executed by the facsimile device shown in FIG. 1.

Next, the sequences of operation executed by the facsimile device 13 will be described with reference to the flowchart shown in FIG. 3.

Firstly, the user sets the original document for transmission in a transmission holder (not shown), operates the control panel 5 to select a provider, and then specifies the recipient of the transmission. The facsimile device 13 reads in the original document in the original document holder one page at a time, and it encodes all of the pages in one operation using an MMR system, and stores this data in the image memory 8.

After entering the Internet electronic mail transmission service, the user decides which one page of the document is to be sent to the destination (steps S1 and S2). The volume of data resulting when this page of the original document is converted to a format which can be handled as electronic mail is then calculated by dummy encoding (step S3).

One example of a method for calculating data volume by dummy encoding is described below.

If, for instance, mail is to be sent to the Internet by means of the series of following conversion processes: MMR (when stored)→MH→TIFF→MIME Base 64, the data volume after conversion from MH to MIME Base 64 can be predicted approximately, but the data volume upon conversion from MMR to MH cannot be predicted. Therefore, this data volume is calculated by encoding one page of data into the encoding system (MH) for transmission, using a 64 Kbyte buffer, and the data volume after conversion to the ultimate data format (MIME Base64) is then predicted.

The information relating to the division of the original document, such as total number of pages, page number, total number of divided blocks (smaller pieces of image data acquired upon dividing single image data), block number, etc. is confirmed (step S4). The transmission data is read from the image memory 8 (step S5), and it is encoded by the encoding system (MH) used for transmission (step S6). This data is then converted to TIFF CLASS F, which is the image data format used by the Internet, and a TIFF CLASS F header is appended, whereupon this binary data is converted to text data (MIME), a MIME header and RFC822 header are appended, and it is converted to electronic mail format (step S7).

An electronic mail header is also appended to the TIFF image data after conversion to text data. This header includes, at the least, the items "From:", "To:" and "Subject:". The user's Internet e-mail (electronic mail) address is inserted in the "From:" field, the recipient's Internet e-mail address is inserted in the "To:" field, and information on the division of the original document is placed in the "Subject:" field, in the format shown in FIG. 2.

It is then determined whether or not the electronic mail now prepared is within the data volume limit for a single mail (step S8). If it exceeds the data volume limit, the process returns to step S4, and the image data for each page of the original document is divided up, whereupon steps S5–S8 are repeated.

On the other hand, if the electronic mail is within the data volume limit for a single mail, the digital data of the electronic mail is transmitted to the communications line (network) from the serial port of the external I/F 12, via the attached data modem 10 and NCU 11 without dividing (step S9).

The facsimile device 13 then calls the PC communications telephone number of a commercial BBS in order to make a connection to the Internet, and it awaits a response. When a telephone circuit or connection is established with the provider, the facsimile device 13 logs in using a PAP (Password Authentication Protocol), and electronic mail converted to an analogue signal is transmitted by the data modem 10 using SMTP (Simple Mail Transfer Protocol).

When the transmission procedure for one page of image data has been completed (step S10), the process returns to step S2, and the image data for the next page is processed. When transmission processing for the image data for all pages has been completed (step S11), the process ends.

In the illustrated embodiment, the facsimile device 13 according to the present invention is connected to a communications network which transmits header information, such as "to:", "subject:" etc. along with the mail data. However, even if the device according to the present invention is connected to a PC communications network such as AOL, Nifty, etc. which transmits this header information after sending the mail data, similar advantages to those of the illustrated embodiment will be obtained.

Furthermore, in the mail data transmission procedure, it is also possible to log in to the network after the dummy encoding operation, and to use a procedure whereby data is taken from the image memory (MMR), stored in MH format in a 64 Kbyte buffer (dummy encoding), and then converted to TIFF, MIME, etc. whilst it is being transmitted to the network.

What is claimed is:

1. A communications terminal device with electronic mail function for transmitting original document image data to a destination by electronic mail, comprising:

calculation means for calculating volume of data resulting when image data for one page of original document to be transmitted is converted to electronic mail data and including an encoding means for encoding said image data using a dummy encoding system;

means for dividing up said image data for one page into a plurality of smaller pieces of data and transmitting them to a destination by a plurality of electronic mails respectively when calculation result of said calculation means exceeds a prescribed amount, the prescribed amount being a limitation determined by an intermediate connection service company and comprising data volume of the electronic mail which can be handled as one mail;

means for transmitting said image data for one page by a single electronic mail without dividing when said calculation result of said calculation means does not exceed the prescribed amount;

means for transmitting first mail management information to a destination if a plurality of pages of original documents are transmitted by a plurality of electronic mails respectively without dividing, the first mail management information including data identifying an original document, and data indicating which electronic mail corresponds to which page of original document, the first mail management information being transmitted to a destination together with the electronics mails and being included in header information appended to the electronic mail; and means for transmitting second mail management information to a destination, when said image data for one page is divided up into smaller pieces of data and transmitted by a plurality of electronic mails, the second mail management information including data indicating which electronic mail corresponds to which smaller piece of data, the second mail management information being included in header information appended to the electronic mail, the header information having a subject field which includes sender information, a job number indicating electronic mail to be handled as a single file, page number and total page number, and image block number and total block number, an image for a single page being divided into blocks when transmitted, and the block number and the total block number both being "one" if the original image is not divided before transmission.

2. The communication terminal device with electronic mail function according to claim 1, wherein the device comprises a facsimile machine including a scanner for reading an image of an original document and a printer for printing an image received from a remote machine.

3. The communication terminal device with electronic mail function according to claim 1, wherein an original document is first encoded by MMR two dimensional encoding and stored in a memory, and the device is capable of dummy encoding including conversion from MMR coding to one dimensional MH coding.

4. The communication terminal device with electronic mail function according to claim 3, wherein in the MMR two dimensional encoding, a previously scanned line is referenced when a current line is encoded, so that an image cannot be reproduced if the original image has been divided into smaller pieces and electronic mail carrying the previously scanned line does not arrive.

* * * * *